US012556426B2

(12) United States Patent
Iwata (10) Patent No.: US 12,556,426 B2
(45) Date of Patent: Feb. 17, 2026

(54) ABNORMALITY DETERMINATION METHOD, INFORMATION PROCESSING DEVICE, AND COMPUTER-READABLE RECORDING MEDIUM RECORDING A PROGRAM

(71) Applicant: Panasonic Intellectual Property Corporation of America, Torrance, CA (US)

(72) Inventor: Keisuke Iwata, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/585,631

(22) Filed: Feb. 23, 2024

(65) Prior Publication Data

US 2024/0195654 A1 Jun. 13, 2024

Related U.S. Application Data

(63) Continuation of application No. PCT/JP2022/028780, filed on Jul. 26, 2022.

(30) Foreign Application Priority Data

Aug. 27, 2021 (JP) ................. 2021-138914

(51) Int. Cl.
*H04L 12/28* (2006.01)
*H04L 9/40* (2022.01)

(52) U.S. Cl.
CPC ...... *H04L 12/2823* (2013.01); *H04L 12/2816* (2013.01); *H04L 63/1425* (2013.01)

(58) Field of Classification Search
None
See application file for complete search history.

(56) References Cited

U.S. PATENT DOCUMENTS

2006/0107321 A1\* 5/2006 Tzadikario .......... H04L 63/1425
726/22
2015/0156074 A1\* 6/2015 Yamada ................ G06Q 10/10
700/275

(Continued)

FOREIGN PATENT DOCUMENTS

JP 2006-203516 8/2006
JP 2007-74058 3/2007

(Continued)

OTHER PUBLICATIONS

International Search Report issued Oct. 4, 2022 in International (PCT) Application No. PCT/JP2022/028780.

*Primary Examiner* — Phyllis A Book
(74) *Attorney, Agent, or Firm* — Wenderoth, Lind & Ponack, L.L.P.

(57) ABSTRACT

An information processing device performs: acquiring remote operation information concerning a remote operation to an appliance; acquiring event information associated with the remote operation and indicating an occurrence of a specific event related to an action of a user; determining whether the remote operation is regular or irregular on the basis of: relevance information indicating a relevance between the remote operation and the event; the acquired remote operation information; and the acquired event information; and outputting an irregularity notification when the remote operation is determined to be irregular.

8 Claims, 7 Drawing Sheets

(56) References Cited

U.S. PATENT DOCUMENTS

2015/0264069 A1* 9/2015 Beauchesne ........ H04L 63/1416
  726/23
2020/0057706 A1* 2/2020 Rome ................. H04L 63/1425
2020/0162281 A1* 5/2020 Sasaki ................ H04L 12/2814

FOREIGN PATENT DOCUMENTS

| JP | 2016-15544 | 1/2016 |
| JP | 2019-9685 | 1/2019 |
| JP | 6473594 B2 * | 2/2019 |

* cited by examiner

| REMOTE OPERATION | ASSOCIATED EVENT | FIRST THRESHOLD |
|---|---|---|
| TURNING-ON OF AIR CONDITIONER | COMING HOME | ONE HOUR |
| UNLOCKING OF ELECTRONIC LOCK | COMING HOME | ONE MINUTE |

| REMOTE OPERATION | TIME | SECOND THRESHOLD | ASSOCIATED EVENT | FIRST THRESHOLD |
|---|---|---|---|---|
| TURNING-ON OF AIR CONDITIONER | 18:00 | THIRTY MINUTES | COMING HOME | ONE HOUR |
| UNLOCKING OF ELECTRONIC LOCK | 19:00 | THIRTY MINUTES | COMING HOME | ONE MINUTE |
| . . . . | | | | |

| REMOTE OPERATION | TIME | SECOND THRESHOLD | SECOND CORRELATION STRENGTH | ASSOCIATED EVENT | FIRST THRESHOLD | FIRST CORRECTION STRENGTH |
|---|---|---|---|---|---|---|
| TURNING-ON OF AIR CONDITIONER | 18:00 | THIRTY MINUTES | WEAK | COMING HOME | ONE HOUR | STRONG |
| UNLOCKING OF ELECTRONIC LOCK | 19:00 | THIRTY MINUTES | STRONG | COMING HOME | ONE MINUTE | STRONG |
| ... | | | | | | |

ABNORMALITY DETERMINATION METHOD, INFORMATION PROCESSING DEVICE, AND COMPUTER-READABLE RECORDING MEDIUM RECORDING A PROGRAM

FIELD OF INVENTION

The present disclosure relates to an irregularity determination method, an information processing device, and a program.

BACKGROUND ART

Patent Literature 1 discloses a device control system including an irregular state determination part. The irregular state determination part decreases an irregularity determination threshold when determining that an operation mode of a controller is a remote operation mode in comparison with determination that the operation mode is not the remote operation mode.

However, Patent Literature 1 fails to consider any determination as to whether a remote operation is regular or irregular on the basis of remote operation information and event information.

Patent Literature 1: Japanese Unexamined Patent Publication No. 2019-9685

SUMMARY OF THE INVENTION

The present disclosure has an object of providing an irregularity determination method, an information processing device, and a computer-readable recording medium recording a program each enabling determination as to whether a remote operation is regular or irregular with a high accuracy on the basis of remote operation information and event information.

An irregularity determination method according to an aspect of the present disclosure includes: by an information processing device, acquiring remote operation information concerning a remote operation to an appliance; acquiring event information associated with the remote operation and indicating an occurrence of a specific event related to an action of a user; determining whether the remote operation is regular or irregular on the basis of: relevance information indicating a relevance between the remote operation and the event; the acquired remote operation information; and the acquired event information; and outputting an irregularity notification when the remote operation is determined to be irregular.

DETAILED DESCRIPTION

Knowledge Forming the Basis of the Present Disclosure

The growth of the IoT technology permits a user to connect various appliances including home appliances to a communication network and remotely operate the appliances from an operation device or terminal, such as a smartphone, via the communication network.

In return for this convenience, a remote operation system always faces a concern of the user that each appliance may be unauthorizedly operated through hacking by a third person or outsider. Under the circumstances, it is important to establish a mechanism which enables detection of an irregular remote operation with a high accuracy to give the user safety feeling and make the remote operation system more widespread.

In the device control system disclosed in Patent Literature 1, the irregular state determination part decreases an irregularity determination threshold when determining that an operation mode of the controller is the remote operation mode in comparison with determination that the operation mode is not the remote operation mode. However, the device control system fails to consider any determination as to whether a remote operation is regular or irregular on the basis of remote operation information and event information, and thus, a determination accuracy is unsatisfactory. Therefore, the determination accuracy needs further improvement.

To solve the drawback, the present inventors have conceived of the present disclosure with the knowledge that determination as to whether a remote operation is regular or irregular is achieved with a high accuracy by using remote operation information and event information associated therewith.

Hereinafter, features of the present disclosure will be described.

An irregularity determination method according to a first feature of the present disclosure includes: by an information processing device, acquiring remote operation information concerning a remote operation to an appliance; acquiring event information associated with the remote operation and indicating an occurrence of a specific event related to an action of a user; determining whether the remote operation is regular or irregular on the basis of: relevance information indicating a relevance between the remote operation and the event; the acquired remote operation information; and the acquired event information; and outputting an irregularity notification when the remote operation is determined to be irregular.

In the first feature, the information processing device determines whether a remote operation is regular or irregular on the basis of: relevance information indicating a relevance between the remote operation and an event; acquired remote operation information; and acquired event information. This enables determination with a high accuracy as to whether the remote operation is regular or irregular.

With an irregularity determination method according to a second feature of the disclosure, in the first feature, the relevance information may include first threshold information about a time difference between an acquisition time of the remote operation information and an occurrence time of the event.

The second feature achieves improvement in the accuracy of determining whether the remote operation is regular or irregular owing to the relevance information including first threshold information about a time difference between an acquisition time of the remote operation information and an occurrence time of the event.

With an irregularity determination method according to a third feature, in the second feature, the irregularity notification may have a different content depending on a correlation strength between the acquisition time of the remote operation information and the occurrence time of the event.

In the third feature, the irregularity notification has a different content depending on a correlation strength. This succeeds in certainly notifying the user of an occurrence of an irregularity in a really high emergency.

With an irregularity determination method according to a fourth feature, in the first or second feature, the remote operation may be determined to be regular or irregular further on the basis of an acquisition time of the remote operation information and second threshold information about a variance of acquisition times.

In the fourth feature, the information processing device determines whether the remote operation is regular or irregular on the basis of an acquisition time of the remote operation information and second threshold information about a variance of acquisition times. This achieves further improvement in the accuracy of determining whether the remote operation is regular or irregular.

With an irregularity determination method according to a fifth feature of the disclosure, in the fourth feature, the irregularity notification may have a different content depending on a correlation strength between the acquisition time of the remote operation information and the variance of acquisition times.

In the fifth feature, the irregularity notification has a different content depending on a correlation strength. This succeeds in certainly notifying the user of an occurrence of an irregularity in a really high emergency.

An irregularity determination method according to a sixth feature of the disclosure may further include, in any one of the first to fifth features, outputting a confirmation notification for causing the user to confirm whether to cancel the remote operation when the remote operation is determined to be irregular.

In the sixth feature, the information processing device outputs a confirmation notification to allow the user to execute a cancellation manipulation to cancel an irregular remote operation.

An irregularity determination method according to a seventh feature of the disclosure may further include, in any one of the first to fifth features, outputting a control instruction to cancel the remote operation when the remote operation is determined to be irregular.

In the seventh feature, the information processing device outputs a control instruction and thus enables cancelation of an irregular remote operation without depending on a cancellation manipulation by the user.

An information processing device according to an eighth feature of the disclosure includes: an acquisition part that acquires remote operation information concerning a remote operation to an appliance, and event information associated with the remote operation and indicating an occurrence of a specific event related to an action of a user; a determination part that determines whether the remote operation is regular or irregular on the basis of: relevance information indicating a relevance between the remote operation and the event; the acquired remote operation information; and the acquired event information; and an output part that outputs an irregularity notification when the remote operation is determined to be irregular.

In the eighth feature, the determination part determines whether a remote operation is regular or irregular on the basis of: relevance information indicating a relevance between the remote operation and an event; acquired remote operation information; and acquired event information. This enables determination with a high accuracy as to whether the remote operation is regular or irregular.

A program according to a ninth feature of the disclosure includes: causing an information processing device to serve as: an acquisition part that acquires remote operation information concerning a remote operation to an appliance, and event information associated with the remote operation and indicating an occurrence of a specific event related to an action of a user; a determination part that determines whether the remote operation is regular or irregular on the basis of: relevance information indicating a relevance between the remote operation and the event; the acquired remote operation information; and the acquired event information; and an output part that outputs an irregularity notification when the remote operation is determined to be irregular.

In the ninth feature, the determination part determines whether a remote operation is regular or irregular on the basis of: relevance information indicating a relevance between the remote operation and an event; acquired remote operation information; and acquired event information. This enables determination with a high accuracy as to whether the remote operation is regular or irregular.

This disclosure can be realized as a program for causing a computer to execute each distinctive feature included in such a method or a device described above, or realized as a system caused to operate by the program. Additionally, it goes without saying that the computer program is distributable as a non-transitory computer readable storage medium like a CD-ROM, or distributable via a communication network like the Internet.

Embodiments of the Present Disclosure

Hereinafter, embodiments of the disclosure will be described in detail with reference to the accompanying drawings. However, unnecessary details of description may be omitted. For instance, details of description about an already well-known matter, or redundant explanation for the substantially same configuration may be omitted. This aims at avoiding redundancy resulting from unnecessary explanation and facilitating the understanding of a person skilled in the art hereafter.

It is noted here that the accompanying drawings and the description below are provided to a person skilled in the art for good understanding of this disclosure without an intention of limiting the scope of the subject-matter recited in the claims by the description.

First Embodiment

Figure 1:
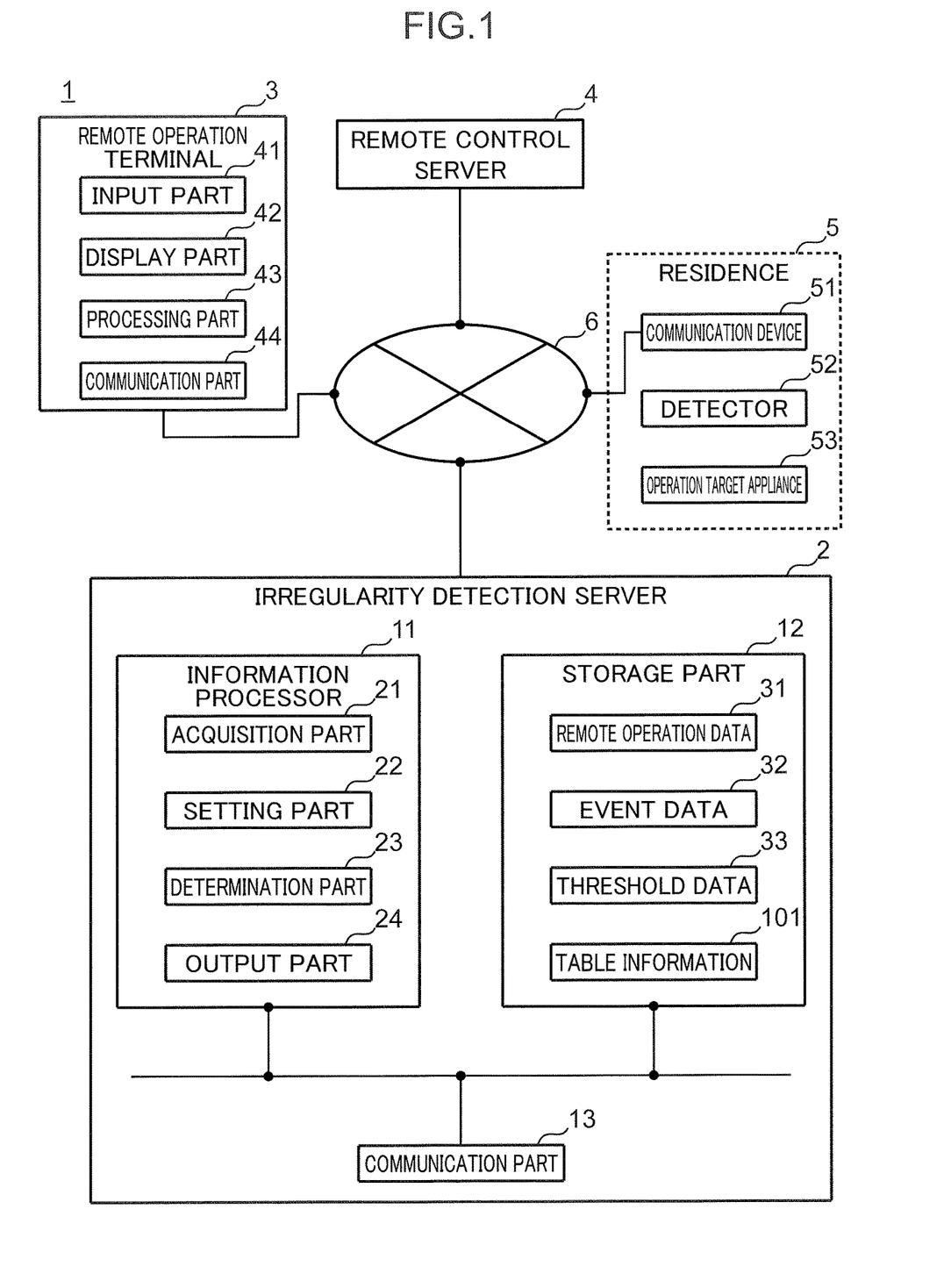
FIG. 1 is a simplified diagram showing an overall configuration of a remote operation system.

FIG. 1 is a simplified diagram showing an overall configuration of a remote operation system 1 in a first embodiment of the present disclosure. The remote operation system 1 includes an irregularity detection server 2, a remote operation terminal 3, a remote control server 4, a communication device 51, a detector 52, and an operation target appliance 53. The operation target appliance 53 is a target appliance to be remotely operated by the remote operation terminal 3. The communication device 51, the detector 52, and the operation target appliance 53 are provided in, for example, a residence 5 where a user lives. The irregularity detection server 2, the remote operation terminal 3, the remote control server 4, and the communication device 51 are communicable with one another via a communication network 6. The communication network 6 includes a special or universal circuit network suitable for a specific communication protocol, such as the IP.

The irregularity detection server 2 includes an information processor 11, a storage part 12, and a communication part 13. The information processor 11 includes, for example, a CPU. The storage part 12 includes an HDD, an SSD, a flush memory, or other memory. The communication part 13 includes a communication module suitable for the communication protocol of the communication network 6. The information processor 11 operatively has an acquisition part 21, a setting part 22, a determination part 23, and an output part 24 each realized when the CPU executes a predetermined program. The storage part 12 stores remote operation data 31, event data 32, threshold data 33, and table information 101. The data and the information will be described in detail later. The acquisition part 21 acquires a remote operation instruction signal as remote operation information concerning a remote operation to the operation target appliance 53 from the remote operation terminal 3 via the communication network 6 and the communication part 13. The acquisition part 21 further acquires an event detection signal as event information indicating an occurrence of an event from the detector 52 via the communication device 51, the communication network 6, and the communication part 13. The acquisition part 21 reads out and acquires, from the storage part 12, the remote operation data 31 and the event data 32 each stored as a database in the storage part 12. The setting part 22 statistically analyzes the remote operation data 31 and the event data 32 acquired by the acquisition part 21. The setting part 22 sets a first threshold on the basis of a result of the data analysis, and stores the threshold data 33 indicating the first threshold in the storage part 12. The setting part 22 further associates a content of the remote operation, a content of an associated event, and the first threshold with one another to create the table information 101 on the basis of the remote operation data 31, the event data 32, and the threshold data 33. The setting part 22 stores the created table information 101 in the storage part 12. The determination part 23 determines whether the remote operation instruction signal to be determined is regular or irregular. The output part 24 generates and outputs an alert notification when the remote operation instruction signal is determined to be irregular.

The remote operation terminal 3 is, for example, a smartphone owned by the user who lives in the residence 5. The remote operation terminal 3 includes an input part 41, a display part 42, a processing part 43, and a communication part 44. The input part 41 and the display part 42 may include, for example, a touch screen display using crystal liquid, organic EL, or other way. The processing part 43 includes, for example, a CPU. The communication part 44 includes a communication module suitable for the communication protocol of the communication network 6.

The residence 5 includes the communication device 51, the detector 52, and the operation target appliance 53 provided therein. The communication device 51 includes, for example, a gateway device to connect the communication network 6 located on an outside of the residence 5 and a communication network, such as a wireless LAN, located in an inside of the residence 5 to each other. The detector 52 includes a sensor for detecting an occurrence of a specific event in the residence 5. The specific event indicates an event or an affair related to an action of the user, and examples of the specific event include leaving home, coming home, pick-up and drop-off for tutoring school, family eating-out, an after-school activity, a school event, and other events. For instance, when the specific event is the leaving home or the coming home of the user, the detector 52 includes a human sensor or a sensor to detect opening and closing of a front door, each sensor being arranged at an entrance of the residence 5. The operation target appliance 53 is an IoT appliance or other appliance to be remotely operated from the outside of the residence 5, e.g., an air conditioner, a front door electronic lock, or a Blu-ray recorder.

The remote control server 4 receives the remote operation instruction signal sent from the remote operation terminal 3, and generates and sends a control signal for controlling the operation to the operation target appliance 53 on the basis of the remote operation instruction signal. The operation target appliance 53 receives the control signal via the communication device 51, so that the operation target appliance 53 is remotely operated.

Figure 2:
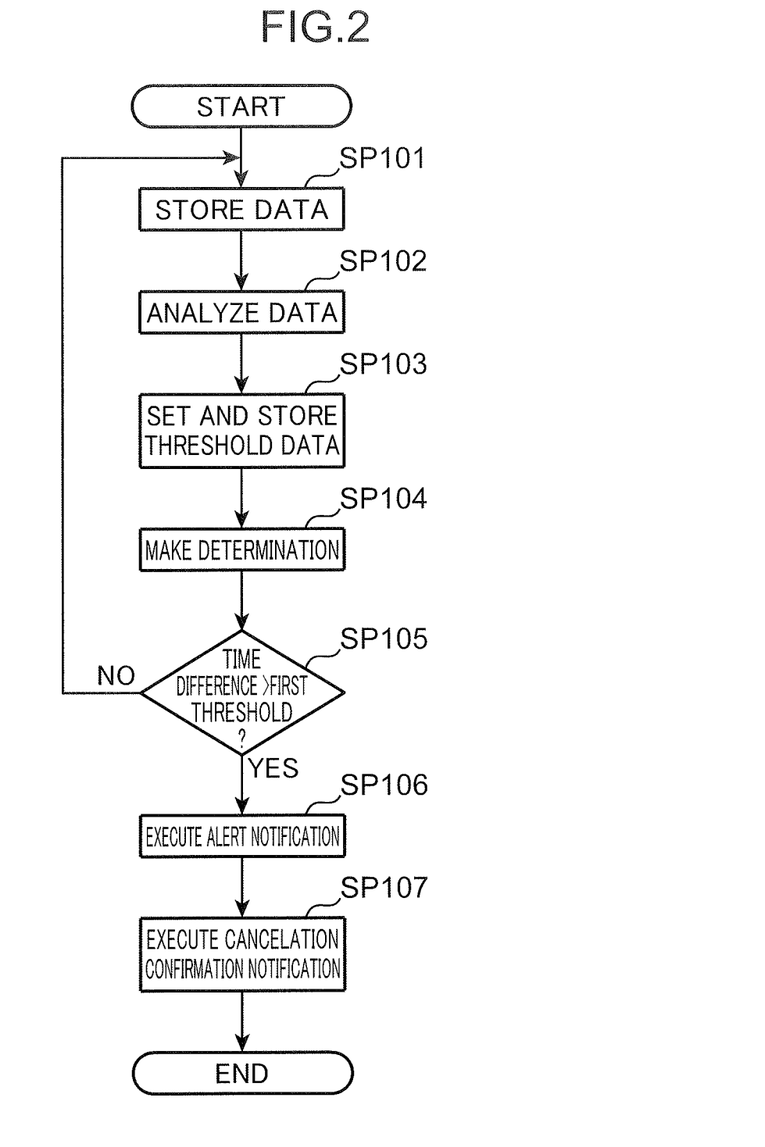
FIG. 2 is a flowchart showing a sequence of a process executed by an information processor.

FIG. 2 is a flowchart showing a sequence of a process executed by the information processor 11 of the irregularity detection server 2.

When the user inputs a remote operation instruction to the operation target appliance 53 from the input part 41 of the remote operation terminal 3, the processing part 43 transmits a relevant remote operation instruction signal from the communication part 44 to the remote control server 4 and the irregularity detection server 2 via the communication network 6. The communication part 13 of the irregularity detection server 2 receives the remote operation instruction signal. In step SP101, the acquisition part 21 acquires, from the communication part 13, the remote operation instruction signal received by the communication part 13. The information processor 11 further stores, in the storage part 12, the remote operation instruction signal received by the communication part 13. The storage part 12 stores the remote operation instruction signal as one record of the remote operation data 31 constituting the database. When the detector 52 detects an occurrence of a specific event in the residence 5, an event detection signal concerning the event is sent from the communication device 51 to the irregularity detection server 2 via the communication network 6. The communication part 13 of the irregularity detection server 2 receives the event detection signal. In step SP101, the acquisition part 21 acquires, from the communication part 13, the event detection signal received by the communication part 13. The information processor 11 further stores, in the storage part 12, the event detection signal received by the communication part 13. The storage part 12 stores the event detection signal as one record of the event data 32 constituting a database. Whenever the communication part 13 receives a remote operation instruction signal and an event detection signal, the storage part 12 stores the remote operation instruction signal and the event detection signal. In this manner, the storage part 12 accumulates the remote operation data 31 as a database including a plurality of records corresponding to a plurality of remote operation instruction signals, and the event data 32 as a database including a plurality of records corresponding to a plurality of event detection signals.

In step SP102, the acquisition part 21 acquires the remote operation data 31 and the event data 32 accumulated in the storage part 12. The setting part 22 statistically analyzes the acquired remote operation data 31 and the acquired event data 32.

In step SP103, the setting part 22 sets a first threshold on the basis of a result of the data analysis in step SP102, and stores the threshold data 33 indicating the first threshold in the storage part 12. The setting part 22 further associates a content of the remote operation, a content of the associated event, and the first threshold with one another to create the table information 101 on the basis of the remote operation data 31, the event data 32, and the threshold data 33, and stores the table information 101 in the storage part 12.

Figure 3:
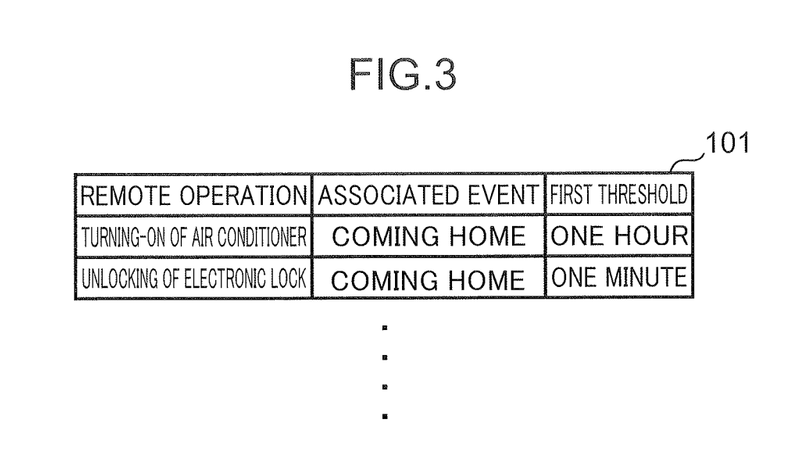
FIG. 3 is a table showing an example of table information.

FIG. 3 is a table showing an example of the table information 101. In this example, a remote operation of "turning-ON of air conditioner" to an air conditioner serving as the operation target appliance 53 is associated with an event of coming home of the user to the residence 5, and "one hour" is set as the first threshold about a time difference between the turning-ON of air conditioner and the coming home. Besides, another remote operation of "unlocking of electronic lock" to a front door electronic lock serving as the operation target appliance 53 is associated with the event of coming home of the user to the residence 5, and "one minute" is set as the first threshold about a time difference between the unlocking of electronic lock and the coming home. Each first threshold corresponds to relevance information indicating a relevance between a remote operation and an associated event. For instance, the setting part 22 can calculate, on the basis of many samples each showing a time difference between a receiving time (acquisition time) of a remote operation instruction signal and a receiving time of an event detection signal (occurrence time of an event) concerning the event, an average value of and a reference deviation $\sigma$ from the time differences, and set a time obtained by adding, for example, a time of "+3$\sigma$" to the average value of the time differences as the first threshold. However, the value "+3$\sigma$" is just an example, and the value may be "+2$\sigma$", "+1$\sigma$", or other value. This is applicable to a second threshold to be described later. In the example shown in FIG. 3, the first threshold for the remote operation of the turning-ON of air conditioner is set to one hour, and the first threshold for the remote operation of the unlocking of electric lock is set to one minute. Specifically, in the example shown in FIG. 3, the user of the residence 5 regularly comes home within one hour from transmission of a remote operation instruction signal concerning the turning-ON of air conditioner, and regularly comes home within one minute from transmission of a remote operation instruction signal concerning the unlocking of electronic lock. Whenever the communication part 13 receives a remote operation instruction signal and an event detection signal, the setting part 22 calculates the first threshold and updates a content of each of the threshold data 33 and the table information 101 stored in the storage part 12.

In step SP104, the determination part 23 determines whether the remote operation instruction signal to be determined is regular or irregular. In the example shown in FIG. 3, when a remote operation instruction signal to be determined indicates the turning-ON of air conditioner, the determination part 23 calculates a time difference between a receiving time (acquisition time) of the remote operation instruction signal concerning the turning-ON of air conditioner and a receiving time (occurrence time) of an event detection signal concerning the event of coming home of the user thereafter, and determines whether the time difference therebetween is equal to or smaller than the first threshold (i.e., falls within "one hour" in the example shown in FIG. 3). When a remote operation instruction signal to be determined indicates the unlocking of electronic lock, the determination part 23 calculates a time difference between a receiving time (acquisition time) of the remote operation instruction signal concerning the unlocking of electronic lock and a receiving time (occurrence time) of an event detection signal concerning the event of coming home of the user thereafter, and determines whether a time difference therebetween is equal to or smaller than the first threshold (i.e., falls within "one minute" in the example shown in FIG. 3).

When the time difference is equal to or smaller than the first threshold (NO in step SP105), the remote operation instruction signal to be determined is determined to be regular, and the process returns to step SP101.

When the time difference exceeds the first threshold (YES in step SP105), the remote operation instruction signal to be determined is determined to be irregular, and the output part 24 generates and outputs, in the subsequent step SP106, an alert notification using, for example, a character or a shape, to notify the user of execution of an irregular remote operation. The communication part 13 transmits data of the alert notification from the output part 24 to the remote operation terminal 3 via the communication network 6. In the remote operation terminal 3, the communication part 44 receives the data of the alert notification, and the processing part 43 displays, on the basis of the data received by the communication part 44, the alert notification on the display part 42.

Next, in step SP107, the output part 24 generates and outputs a cancelation confirmation notification using, for example, a character or a shape to cause the user to confirm whether to cancel the irregular remote operation. The communication part 13 transmits data of the cancelation confirmation notification from the output part 24 to the remote operation terminal 3 via the communication network 6. In the remote operation terminal 3, the communication part 44 receives the data of the cancelation confirmation notification, and the processing part 43 displays, on the basis of the data received by the communication part 44, the cancelation confirmation notification on the display part 42.

When the user inputs a cancelation instruction of canceling the remote operation from the input part 41 of the remote operation terminal 3, the processing part 43 transmits a relevant cancelation instruction signal from the communication part 44 to the remote control server 4 via the communication network 6. The remote control server 4 receives the cancelation instruction signal transmitted from the remote operation terminal 3, and generates and sends a control signal for cancelling the remote operation of the operation target appliance 53 on the basis of the remote operation instruction signal. The operation target appliance 53 receives the control signal via the communication device 51, so that the remote operation to the operation target appliance 53 is cancelled.

The remote operation terminal 3 may include a speaker to output each of the alert notification in step SP106 and the cancelation confirmation notification in step SP107 as a voice message instead of displaying each notification by using the character or the shape on the display part 42.

The alert notification in step SP106 and the cancelation confirmation notification in step SP107 may not be individually executed in their respective steps, but may be simultaneously executed in a single step.

The cancelation confirmation notification in step SP107 may represent a request signal concerning a request for an input of response from the user as to whether to cancel an irregular remote operation. In a case where the input part 41 receives an input of response to cancel the remote operation through tapping of a cancellation button, a signal concerning the response may be sent from the remote operation terminal 3 to the irregularity detection server 2, and a cancelation control instruction for the remote operation may be sent from the irregularity detection server 2 to the remote control server 4. Here, when the determination part 23 determines that the remote operation is irregular, the irregularity detection server 2 may immediately send a cancelation control instruction for the remote operation to the remote control server 4 without the input of response from the user.

The request for the input of response from the user or the immediate sending of the cancelation control instruction without the input of response may be selectively set depending on a kind of remote operation. For instance, the input of response from the user is requested for a remote operation having lower security importance, such as the turning-ON of air conditioner, and the immediate sending of the cancelation control instruction may be selected for a remote operation having higher security importance, such as the unlocking of electronic lock.

When the associated event indicates the leaving home or the coming home of the user, the determination part 23 may determine a person having left home or having come home is a real registered user by analyzing an image captured by a camera arranged at the entrance of the residence 5 or collating beacon information received from the smartphone owned by the person. In a case where the event has not been executed by the real registered user, the determination part 23 may disregard the event as not occurring.

According to the embodiment, the irregularity detection server 2 (information processing device) may determine whether a remote operation to be determined is regular or irregular on the basis of: the first threshold (relevance information) indicating a relevance between the remote operation and an associated event; and a remote operation instruction signal (remote operation information) and an event detection signal (event information) each acquired by the acquisition part 21. This enables determination with a high accuracy as to whether the remote operation is regular or irregular.

This embodiment further achieves improvement in the accuracy of determining whether a remote operation is regular or irregular owing to the relevance information including the threshold data 33 (first threshold information) about a time difference between an acquisition time of a remote operation instruction signal and an occurrence time of an event.

In the embodiment, the irregularity detection server 2 outputs a cancelation confirmation notification to allow the user to execute a cancellation manipulation to cancel an irregular remote operation.

In the embodiment, the irregularity detection server 2 outputs a cancelation control instruction to enable immediate cancellation of an irregular remote operation without depending on a cancelation manipulation by the user.

Second Embodiment

Although the determination part 23 determines whether a time difference between an acquisition time of a remote operation instruction signal and an occurrence time of an associated event is equal to or smaller than the first threshold in the first embodiment, the determination part may additionally determine whether the acquisition time of the remote operation instruction signal indicates a value equal to or smaller than a second threshold about a variance of acquisition times. Alternatively, a remote operation may be determined to be regular or irregular only on the basis of the second threshold without using the first threshold.

Figure 4:
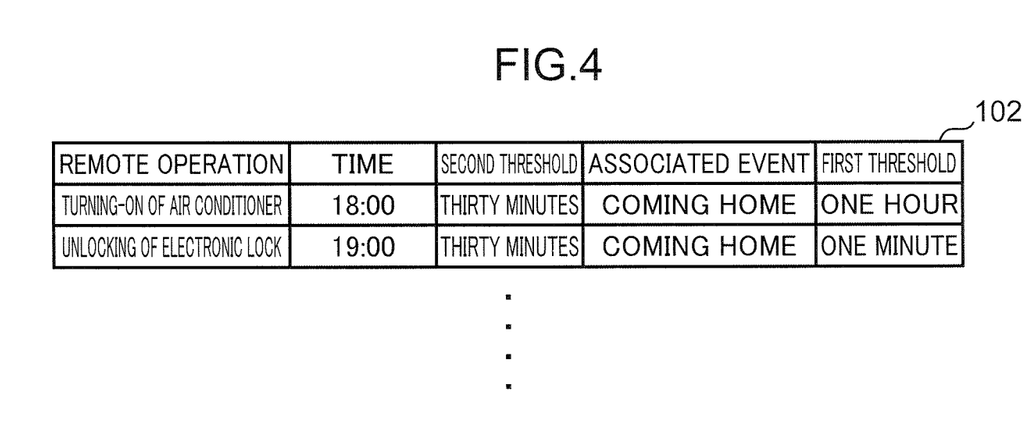
FIG. 4 is a table showing an example of table information.

FIG. 4 is a table showing an example of table information 102. In the embodiment, the storage part 12 stores the table information 102 in place of the table information 101 shown in FIG. 1. In the example shown in FIG. 4, in addition to the items shown in FIG. 3, the time "18:00" is set as an average acquisition time for turning-ON of air conditioner, and a time difference from the average acquisition time is set to "30 minutes" as the second threshold. Further, the time "19:00" is set as an average acquisition time for unlocking of electronic lock, and a time difference from the average acquisition time is set to "30 minutes" as the second threshold. In the embodiment, the storage part 12 stores threshold data 33 indicating the first threshold and the second threshold.

The second threshold indicates a maximum permissible value in a variance of acquisition times of remote operation information. For instance, the setting part 22 can calculate an average value and a reference deviation $\sigma$ on the basis of many samples each showing a receiving time (acquisition time) of a remote operation instruction, and set a time corresponding to, for example, a time of plus or minus $3\sigma$ with respect to the average value as the second threshold. Specifically, in the example shown in FIG. 4, a user of the residence 5 regularly sends a remote operation instruction signal concerning the turning-ON of air conditioner in a time period from 17:30 to 18:30, and a remote operation instruction signal concerning the unlocking of electronic lock in a time period from 18:30 to 19:30. Whenever the communication part 13 receives a remote operation instruction signal, the setting part 22 calculates the second threshold and updates a content of each of the threshold data 33 and the table information 102 stored in the storage part 12.

In step SP104, the determination part 23 executes the following determination in addition to the determination in the first embodiment. In the example shown in FIG. 4, when a remote operation instruction signal to be determined indicates the turning-ON of air conditioner, the determination part 23 calculates a time difference between an acquisition time of the remote operation instruction signal concerning the turning-ON of air conditioner and the average acquisition time (18:00), and determines whether the time difference is equal to or smaller than the second threshold (i.e., falls within thirty minutes). Besides, when a remote operation instruction signal to be determined indicates the unlocking of electronic lock, the determination part 23 calculates a time difference between an acquisition time of the remote operation instruction signal concerning the unlocking of electronic lock and the average acquisition time (19:00), and determines whether the time difference is equal to or smaller than the second threshold (i.e., falls within thirty minutes).

The determination part 23 further determines, in addition to the determination in the first embodiment, that the remote operation instruction signal to be determined is regular when the time difference between the acquisition time of the remote operation instruction signal and the average acquisition time is equal to or smaller than the second threshold. Specifically, the determination part 23 determines that the remote operation instruction signal to be determined is regular, when the time difference between the acquisition time of the remote operation instruction signal and an occurrence time of an associated event is equal to or smaller than the first threshold and the time difference between the acquisition time of the remote operation instruction signal and the average acquisition time is equal to or smaller than the second threshold. By contrast, the determination part determines that the remote operation instruction signal to be determined is irregular, when the time difference between the acquisition time of the remote operation instruction signal and the average acquisition time exceeds the second threshold. Specifically, the determination part 23 determines that the remote operation instruction signal to be determined is irregular, when the time difference between the acquisition time of the remote operation instruction signal and an occurrence time of an associated event exceeds the first threshold or the time difference between the acquisition time of the remote operation instruction signal and the average acquisition time exceeds the second threshold.

In the embodiment, the determination part 23 determines, in addition to the determination in the first embodiment, whether the remote operation instruction signal is regular or irregular on the basis of the acquisition time of the remote operation instruction signal and the second threshold information about a variance of acquisition times. This achieves further improvement in the accuracy of determining whether the remote operation is regular or irregular.

Third Embodiment

Figure 5:
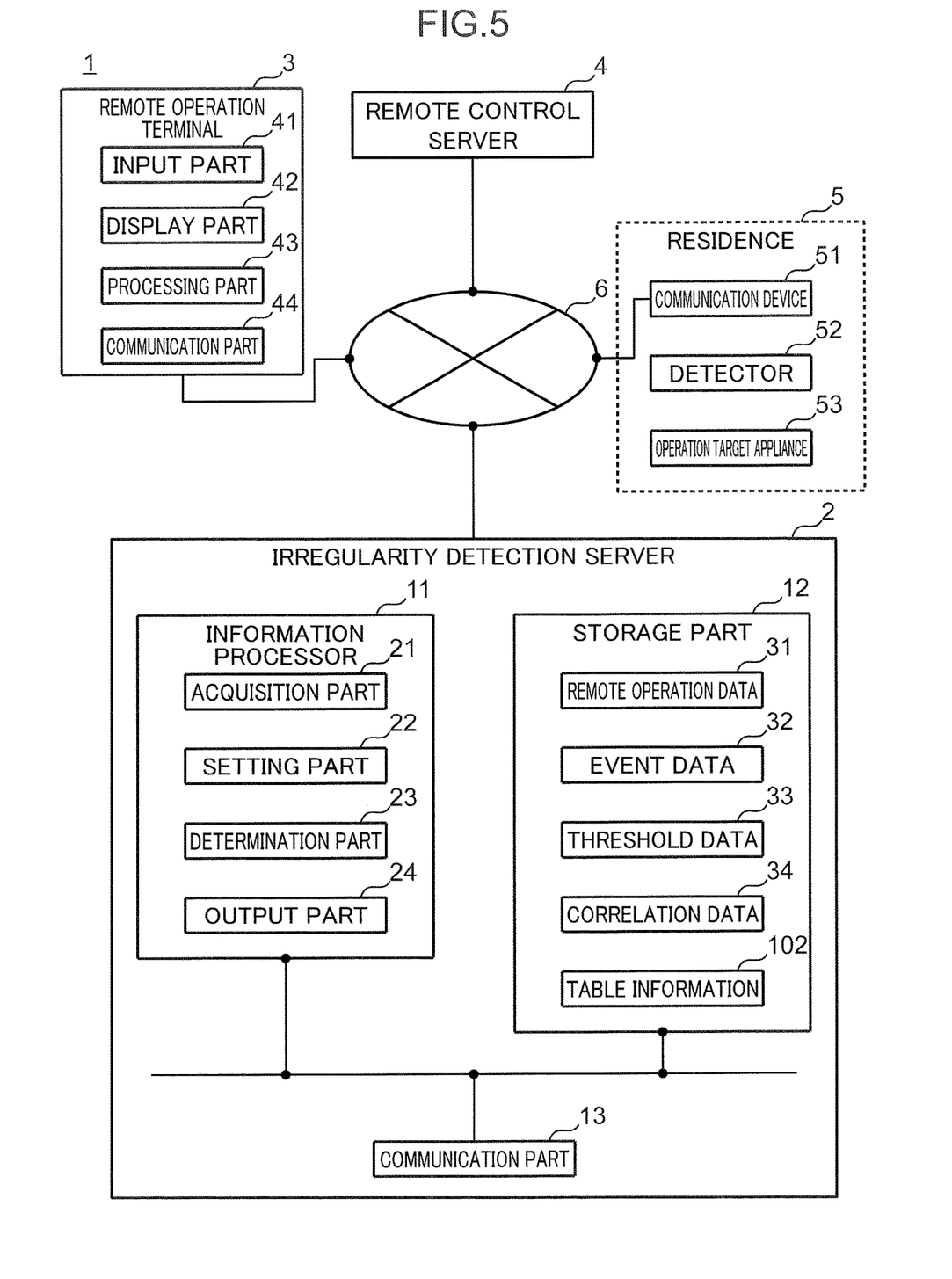
FIG. 5 is a simplified diagram showing an overall configuration of a remote operation system.

The information processor 11 may permit the irregularity notification to have a different content depending on a correlation strength between an acquisition time of a remote operation instruction signal and an occurrence time of an event or depending on a correlation strength between the acquisition time of the remote operation instruction signal and a variance of acquisition times. FIG. 5 is a simplified diagram showing an overall configuration of a remote operation system 1 in a third embodiment of the disclosure. In addition to the configuration of the first embodiment or the second embodiment, a storage part 12 stores correlation data 34.

Figure 6:
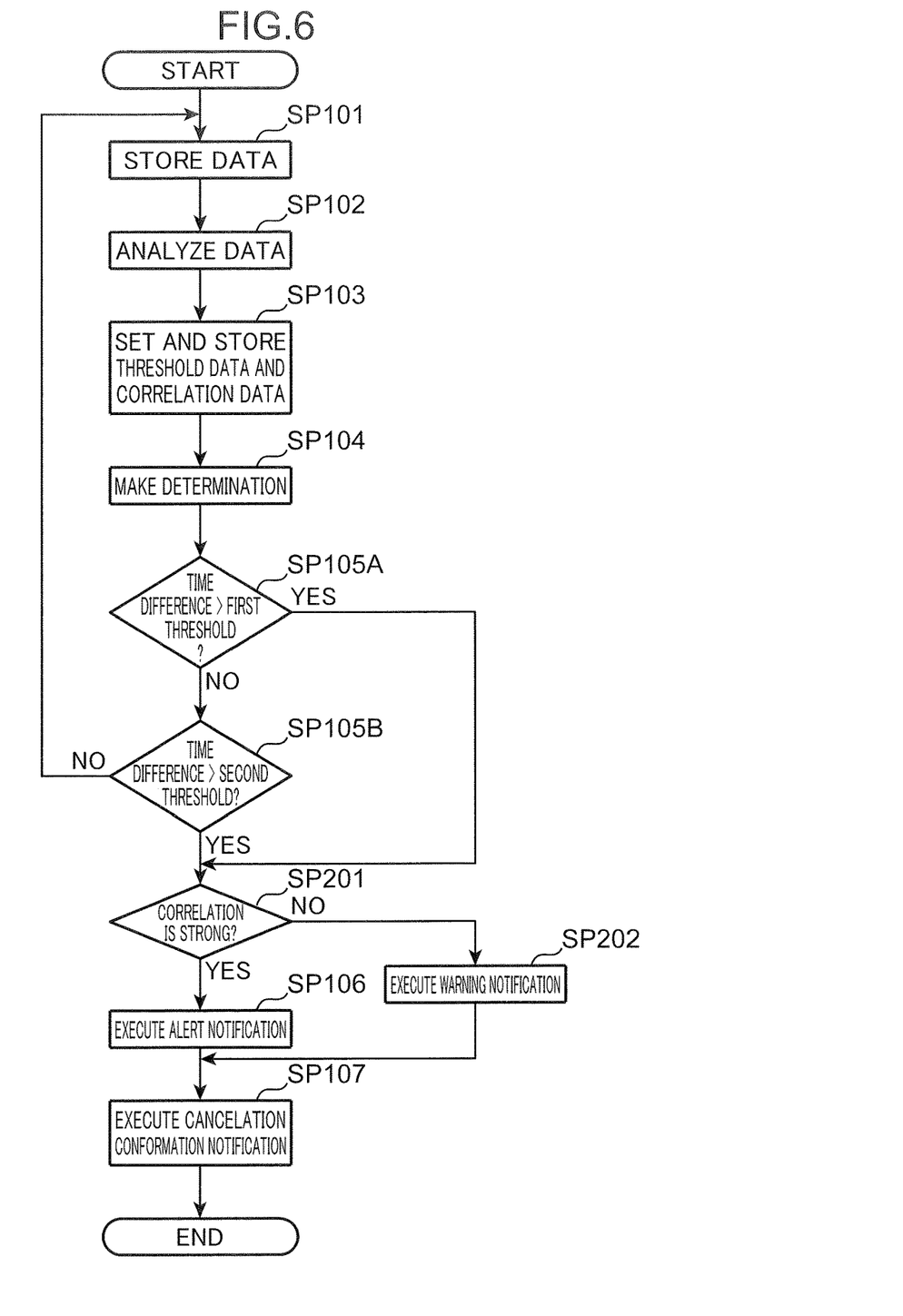
FIG. 6 is a flowchart showing a sequence of a process executed by an information processor.

FIG. 6 is a flowchart showing a sequence of a process executed by an information processor 11 in the third embodiment. Hereinafter, differences from the second embodiment will be mainly discussed.

In step SP103, a setting part 22 sets a first correlation strength and a second correlation strength on the basis of a result of data analysis in step SP102, and stores correlation data 34 indicating the set content in a storage part 12. The first correlation strength represents a strength of correlation (smallness of variance) between an acquisition time of a remote operation instruction signal and an occurrence time of an associated event at one of two levels "strong" and "weak". The second correlation strength represents a strength of correlation between an acquisition time of a remote operation instruction signal and a variance of acquisition times at one of two levels "strong" and "weak". However, each of the first correlation strength and the second correlation strength may be represented at one of three or more levels. The setting part 22 creates table information 103 associating a content of a remote operation, a content of the associated event, the first threshold and the second threshold, and the first correlation strength and the second correlation strength with one another, on the basis of remote operation data 31, event data 32, threshold data 33, and the correlation data 34, and the setting part further stores the table information 103 in the storage part 12.

Figure 7:
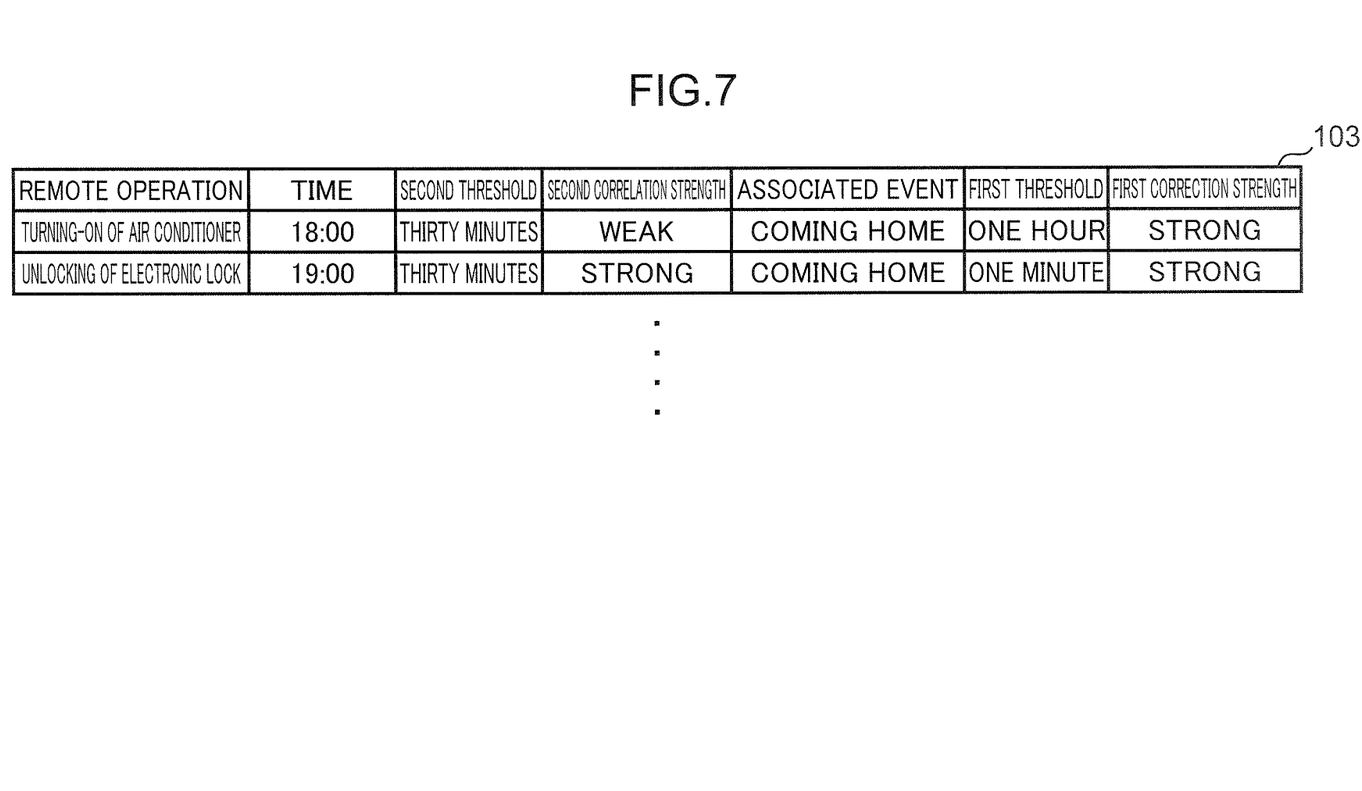
FIG. 7 is a table showing an example of table information.

FIG. 7 is a table showing an example of the table information 103. The first correlation strength is set in accordance with the first threshold, and the second correlation strength is set in accordance with the second threshold. In the example shown in FIG. 7, the first correlation strength is set at the "strong" level in accordance with the first threshold (one hour) for turning-ON of air conditioner, and the first correlation strength is set at the "strong" level in accordance with the first threshold (one minute) for unlocking of electronic lock. The second correlation strength is set at the "weak" level in accordance with the second threshold (thirty minutes) for the turning-ON of air conditioner, and the second correlation strength is set at the "strong" level in accordance with the second threshold (thirty minutes) for the unlocking of electronic lock.

When a time difference between an acquisition time of a remote operation instruction signal and an occurrence time of an associated event is equal to or smaller than the first threshold (NO in step SP105A) and a time difference between the acquisition time of the remote operation instruction signal and an average acquisition time is equal to or smaller than the second threshold (NO in step SP105B), a determination part 23 determines that the remote operation instruction signal to be determined is regular, and the process returns to step SP101. By contrast, when the time difference between the average acquisition time of the remote operation instruction signal and the occurrence time of the associated event exceeds the first threshold (YES in step SP105A) or the time difference between the acquisition time of the remote operation instruction signal and the average acquisition time exceeds the second threshold (YES in step SP105B), the determination part 23 determines, in the subsequent step SP201, whether a correlation strength set in accordance with the exceeding threshold is at the "strong" level or "weak" level.

When the correlation strength indicates the "strong" level (YES in step SP201), an output part 24 generates and outputs, in next step SP106, an alert notification displayed in a notable manner to prominently notify the user of execution of an irregular remote operation. A communication part 13 transmits data of the alert notification from the output part 24 to a remote operation terminal 3 via a the communication network 6. In the remote operation terminal 3, the communication part 44 receives the data of the alert notification, and a processing part 43 displays, on the basis of the data received by the communication part 44, the alert notification on a display part 42.

When the correlation strength indicates the "weak" level (NO in step SP201), the output part 24 generates and outputs, in next step SP202, a warning notification displayed in a regular manner to regularly notify the user of execution of an irregular remote operation. The communication part 13 transmits data of the warning notification from the output part 24 to the remote operation terminal 3 via the communication network 6. In the remote operation terminal 3, the communication part 44 receives the data of the warning notification, and the processing part 43 displays, on the basis of the data received by the communication part 44, the warning notification on the display part 42.

The correlation strength may be set in accordance with a kind of operation target appliance 53. For instance, the correlation strength is set at the "weak" level for an operation target appliance 53 having lower security importance, such as the air conditioner, and the correlation strength is set at the "strong" level for an operation target appliance 53 having higher security importance, such as the electronic lock of a front door.

According to the embodiment, the irregularity notification has a different content depending on the correlation strength. This succeeds in certainly notifying the user of an occurrence of an irregularity in a really high emergency.

For instance, the output part 24 executes a first irregularity notification (corresponding to the warning notification in the aforementioned example) displayed in the regular manner when a correlation strength falls below a threshold (at the "weak" level in the aforementioned example) to allow the irregularity notification to have a different content depending on the correlation strength. By contrast, the output part 24 executes a second irregularity notification (corresponding to the alert notification in the aforementioned example) displayed in the notable manner suggesting a higher emergency than an emergency in the first irregularity notification when the correlation strength is equal to or larger than the threshold (at the "strong" level in the aforementioned example). This succeeds in certainly notifying the user of an occurrence of an irregularity in a really high emergency.

The present disclosure is particularly applicable to a remote operation system that enables a remote operation from an operation terminal, such as a smartphone, to an IoT appliance or other appliance located in a residence.

The invention claimed is:

1. An irregularity determination method, comprising:
by an information processing device,
acquiring remote operation information concerning a remote operation to an appliance;
acquiring event information associated with the remote operation and indicating an occurrence of a specific event related to an action of a user;
determining whether the remote operation is regular or irregular on the basis of: relevance information indicating a relevance between the remote operation and the event, the acquired remote operation information, and the acquired event information; and
outputting an irregularity notification when the remote operation is determined to be irregular,
wherein the relevance information includes first threshold information about a time difference between an acquisition time of the remote operation information and an occurrence time of the event.

2. The irregularity determination method according to claim 1, wherein the irregularity notification has a different content depending on a correlation strength time difference between the acquisition time of the remote operation information and the occurrence time of the event.

3. The irregularity determination method according to claim 1, wherein the remote operation is determined to be regular or irregular further on the basis of an acquisition time of the remote operation information and second threshold information about a variance of acquisition times.

4. The irregularity determination method according to claim 3, wherein the irregularity notification has a different content depending on a correlation strength time difference between the acquisition time of the remote operation information and the variance of acquisition times.

5. The irregularity determination method according to claim 1, further comprising outputting a confirmation notification for causing the user to confirm whether to cancel the remote operation when the remote operation is determined to be irregular.

6. The irregularity determination method according to claim 1, further comprising outputting a control instruction to cancel the remote operation when the remote operation is determined to be irregular.

7. An information processing device, comprising:
an acquisition part that acquires remote operation information concerning a remote operation to an appliance, and event information associated with the remote operation and indicating an occurrence of a specific event related to an action of a user;
a determination part that determines whether the remote operation is regular or irregular on the basis of: relevance information indicating a relevance between the remote operation and the event, the acquired remote operation information, and the acquired event information; and
an output part that outputs an irregularity notification when the remote operation is determined to be irregular,
wherein the relevance information includes first threshold information about a time difference between an acquisition time of the remote operation information and an occurrence time of the event.

8. A computer-readable recording medium recording a program causing an information processing device to serve as:
an acquisition part that acquires remote operation information concerning a remote operation to an appliance, and event information associated with the remote operation and indicating an occurrence of a specific event related to an action of a user;
a determination part that determines whether the remote operation is regular or irregular on the basis of: relevance information indicating a relevance between the remote operation and the event, the acquired remote operation information, and the acquired event information; and
an output part that outputs an irregularity notification when the remote operation is determined to be irregular,
wherein the relevance information includes first threshold information about a time difference between an acquisition time of the remote operation information and an occurrence time of the event.

* * * * *